(12) United States Patent
Cabrel et al.

(10) Patent No.: US 10,933,519 B2
(45) Date of Patent: Mar. 2, 2021

(54) SYSTEM AND METHOD FOR MANAGING DATA-EXCHANGE TORQUE WRENCHES

(71) Applicant: SCS CONCEPT S.R.L., Cusano Milanino (IT)

(72) Inventors: Marco Angelo Cabrel, Corsico (IT); Roberto Boccellato, Seriate (IT)

(73) Assignee: SCS CONCEPT S.R.L., Cusano Milanino (IT)

( * ) Notice: Subject to any disclaimer, the term of this patent is extended or adjusted under 35 U.S.C. 154(b) by 132 days.

(21) Appl. No.: 16/308,197

(22) PCT Filed: Jun. 12, 2017

(86) PCT No.: PCT/IB2017/053457
§ 371 (c)(1),
(2) Date: Dec. 7, 2018

(87) PCT Pub. No.: WO2017/216700
PCT Pub. Date: Dec. 21, 2017

(65) Prior Publication Data
US 2019/0299375 A1    Oct. 3, 2019

(30) Foreign Application Priority Data

Jun. 13, 2016  (IT) .................... 102016000060405
Jun. 13, 2016  (IT) .................... 102016000060420

(51) Int. Cl.
*H02J 7/00* (2006.01)
*B25B 23/147* (2006.01)
(Continued)

(52) U.S. Cl.
CPC ............ *B25B 23/147* (2013.01); *B25B 13/46* (2013.01); *B25B 23/00* (2013.01); *B25B 23/14* (2013.01);
(Continued)

(58) Field of Classification Search
CPC ....... B25B 23/147; B25B 13/46; B25B 23/14; B25B 23/00; B25F 5/00; B25F 5/02; G06K 7/10297; G06K 19/0723
See application file for complete search history.

(56) References Cited

U.S. PATENT DOCUMENTS

2008/0208522 A1    8/2008  Lucke
2013/0109375 A1*   5/2013  Zeiler ................... H04W 4/029
                                              455/426.1
(Continued)

FOREIGN PATENT DOCUMENTS

DE    20 2007 002793     5/2007
DE    10 2012 017376    12/2013
(Continued)

OTHER PUBLICATIONS

International Search Report and Written Opinion of the International Searching Authority dated Sep. 27, 2017, issued in International Application No. PCT/IB2017/053457.

*Primary Examiner* — Nghia M Doan
(74) *Attorney, Agent, or Firm* — Perkins Coie LLP

(57) ABSTRACT

An electronic torque wrench system comprises a plurality of wrenches (11) which communicate with NFC (Near Field Communication) units (12, 42, 44) connected to a unit (20) for managing the plurality of wrenches. The wrench (11) and the external NFC unit (12, 42, 44) each comprise an NFC module (18, 19) for data exchange between wrench and external unit when the wrench is moved close to the external unit. A recharging base, a system and a method for managing the wrenches are also described.

12 Claims, 2 Drawing Sheets

(51) Int. Cl.
*B25F 5/02* (2006.01)
*G06K 7/10* (2006.01)
*G06K 19/07* (2006.01)
*B25B 13/46* (2006.01)
*B25F 5/00* (2006.01)
*B25B 23/14* (2006.01)
*B25B 23/00* (2006.01)

(52) U.S. Cl.
CPC .................. *B25F 5/00* (2013.01); *B25F 5/02* (2013.01); *G06K 7/10297* (2013.01); *G06K 19/0723* (2013.01)

(56) References Cited

U.S. PATENT DOCUMENTS

| | | | |
|---|---|---|---|
| 2014/0165796 A1 | 6/2014 | Gauthier et al. | |
| 2015/0318732 A1* | 11/2015 | Heine | H02J 5/005 320/108 |
| 2016/0342151 A1* | 11/2016 | Dey, IV | G05B 19/4155 |

FOREIGN PATENT DOCUMENTS

| | | | |
|---|---|---|---|
| DE | 10 2012 112950 | 6/2014 | |
| DE | 10 2012 112956 | 6/2014 | |
| EP | 2 602 682 | 6/2013 | |
| EP | 2 995 429 | 3/2016 | |
| GB | 2 511 591 | 9/2014 | |
| WO | 03/045635 | 6/2003 | |
| WO | 2004/003695 | 1/2004 | |
| WO | 2015/061370 | 4/2015 | |
| WO | WO-2015061370 A1 * | 4/2015 | ........... B25B 21/008 |

* cited by examiner

SYSTEM AND METHOD FOR MANAGING DATA-EXCHANGE TORQUE WRENCHES

This application is a National Stage of International Application PCT/IB2017/053457, filed Jun. 12, 2017, published Dec. 21, 2017, under PCT Article 21(2) in English; which claims the priority of Italian Application Nos. 102016000060420, filed Jun. 13, 2016 and 102016000060405, filed Jun. 13, 2016. The contents of the above-identified applications are incorporated herein by reference in their entireties.

The present invention relates a system of electronic torque wrenches. The electronic torque wrench is of the type comprising an electronic unit for storing, controlling and displaying the tightening parameters. Here "electronic torque wrench" is understood as meaning an electronic tightening device provided with torque and angle and/or sensors for electronic control and/or actuation of the tightening operation.

In order to operate, these wrenches require an electric power supply source. Moreover, an electrical connection is often necessary for the exchange of information from and to the wrench, for example in order to set automatically the operating parameters thereof and/or download the operating information stored during use of the said wrench.

For the electric power supply often the wrenches are equipped with a rechargeable internal battery.

Electrical connectors or contacts on the external surface of the wrench furthermore allow connection with a suitable recharger and also serve for data exchange. In order to facilitate the connection, supports in which the wrenches must be inserted in order to engage automatically the electrical recharging and/or data exchange contacts have also been proposed.

Owing to the conditions in which the torque wrenches are used (for example on motor-vehicle assembly lines), the use of electrical connectors or contacts always gives rise to problems of reliability. In particular, moisture or dirt on the contacts may result in false connections with recharging problems. In order to remedy this it has been proposed providing the contacts with sealed covers which must be removed before connection. This constitutes, however, an operational hindrance and may give rise to errors, for example with the user repositioning the wrench in the seat in order to recharge it, but forgetting to remove the protection covers. Moreover the continuous removal and repositioning of the covers may result in breakage thereof, making them unusable.

A further problem is that the positioning must in any case be precise in order to ensure the connection and this requires particular attention on the part of the user.

One problem is also due to the need for the wrench to be able to communicate its data externally and receive from the exterior the programming data also during use. In order to achieve this wrenches provided with a special communication connector for connecting the wrench to an external system, for example a system for managing the wrenches within the plant, have been proposed.

The need to physically connect a connector gives rise to the aforementioned problems of reliability. Moreover the use of such a connector means that the wrench is bound to a fixed station for the duration of the transfer.

It is in any case preferable that the wrenches should not be bound by the presence of electrical cables which complicate their use in the field.

In order to solve partially these problems wrenches have been proposed where the data transmission is performed via wireless interfaces with the wrenches which communicate with fixed systems over relatively large distances within the plant. In the environments in which torque wrenches are normally used, however, often there are many sources of radio interference which often make the transmission of the information to and from the wrench unreliable or in any case very slow. Moreover, several wrenches which are transmitting or receiving may interfere with each other, disturbing the data exchange. The management of the wrenches in large plants may therefore be very difficult, in particular if the various wrenches present in the plant must have different settings depending on the zone or station of the plant where they are used. It is also necessary to provide complex communication methods in order to select the right wrenches from among those which communicate or may communicate wirelessly in the plant.

The general object of the present invention is to provide a system with a plurality of torque wrenches which allows a rapid, reliable and practical exchange of information to and from the wrenches of the plurality. A further object is to allow rapid, reliable and efficient management of the wrenches. A further object is to provide efficient and easy recharging of wrenches without electrical connection problems for recharging.

In view of these objects the idea which has occurred is to provide a system according to claim 1. Furthermore it has been thought to provide a management method according to claim 7. It has also been thought to provide an assembly comprising an electronic torque wrench and an external unit for communication with the wrench, wherein the wrench and the external unit each comprise an NFC module for data exchange between wrench and external unit when the wrench is moved close to the external unit.

The wrench may comprise rechargeable batteries and, again according to the invention, the assembly may also comprise a recharging base and recharging may be performed advantageously by means of induction energy transfer.

A system according to the invention may comprise a plurality of wrench and external communication unit assemblies and further comprise a unit for managing the wrenches, which exchanges information with the wrenches and/or external communication units via a communication line.

A method for managing electronic torque wrenches in a plant comprising the said system may comprise the steps of exchanging with the wrenches operating parameters and/or data by means of the NFC modules of the wrenches, adopting one or more of the following conditions:
  when a wrench is connected to a recharging base, if the base is equipped with an NFC module, exchanging with the NFC module of the wrench the operating parameters and/or data by means of the NFC module of the recharging base;
  when a wrench is moved close to a communication unit, exchanging with the NFC module of the wrench the operating parameters and/or data by means of the NFC module of the communication unit;
  when a wrench is connected via its NFC module to the NFC module of another wrench, exchanging with the other wrench the operating parameters and/or data by means of the respective NFC modules of the wrenches.

In order to illustrate more clearly the innovative principles of the present invention and its advantages compared to the prior art, an example of embodiment applying these principles will be described below with the aid of the accompanying drawings. In the drawings.

Figure 1:
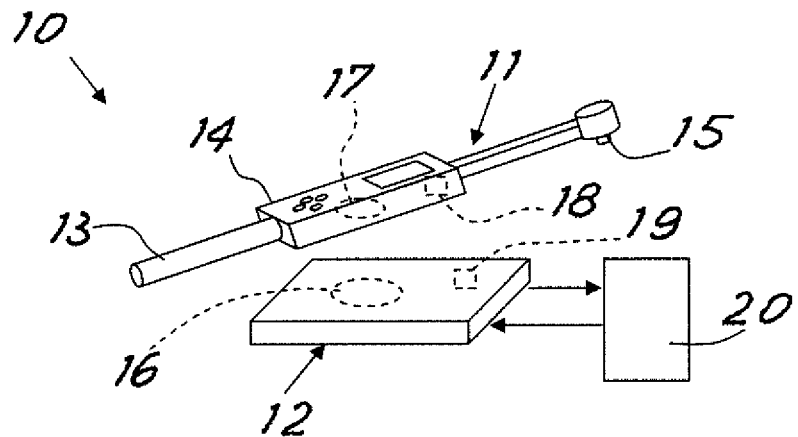
FIG. 1 shows a schematic perspective view of an assembly comprising torque wrench plus recharging and/or data exchange station which can be used in a system according to the invention.

With reference to the figures, FIG. 1 shows an assembly, denoted overall by 10, comprising a torque wrench 11 and a recharging and/or data exchange base 12.

In the example of embodiment, the wrench 11, which has a generally elongated shape, comprises a grip 13, a box-shaped body 14 (containing the electronic circuits of the wrench) and a tightening head 15. Internally the wrench will have a rechargeable power supply battery and known sensors for detecting the torque and, if necessary, the tightening angle imparted by the wrench. During use the electronic circuit of the wrench may detect for example the tightening parameters and indicate that a correct tightening setting has been reached depending on the parameters detected and the reference values stored. Moreover, the wrench may show on a display the parameters and any other information. It may also store if necessary the operating parameters and modes for subsequent documentation purposes, etc. All of this is well-known to the person skilled in the art and will not be illustrated nor described further.

Advantageously the wrench 11 comprises an NFC (Near Field Communication) module 18 intended to exchange information sent to and from the wrench. The exchange may occur with another similar wrench and/or an NFC unit which may also be inside the base 12, which is also preferably provided with an NFC module 19. As is known, NFC systems communicate with each other when they are positioned at a short distance (for example maximum of 5-10 cm) from each other.

The base 12 may advantageously contain an inductive coupling coil 16 powered by a suitable electric source and intended to be coupled with a complementary coil 17 contained in the wrench. Coupling takes place when the wrench is situated substantially in contact with the base so that the coil 17 in the wrench may receive inductively electric power from the coil 16. The recharging base may be a stand-alone system used locally only for recharging a wrench or, preferably, may form part of a complex wrench management system.

The recharging base may also have a cradle-like shape so as to ensure specific positioning of the wrench and/or support the wrench (for example in the case where the base is mounted on a vertical surface, so that the wrench can be "hung" from the base). The shape of the cradle may depend on the specific shape of the wrench, even though, owing to the wireless recharging, a cradle able to receive also differently shaped wrenches may be easily provided.

NFC (Near Field Communication) may also be used locally by the recharging base for suitably setting the recharging base depending on the specific wrench or wrench model positioned on the base. In this case the NFC module of the wrench will communicate to the NFC module of the base the model or identity of the wrench placed on the base and optionally parameters useful for recharging (such as the charged state of the batteries and/or the number of recharging operations already performed) and the base will set the recharging parameters depending on the information received.

Advantageously, the exchange of data between base and wrench may also be managed or supervised by an external electronic management unit 20, for example forming part of a system for computerized management of the wrenches in the plant, which may store in its memory and trace the position and use of the wrenches in the system, the wrenches which are faulty or must be withdrawn from service, any replacement wrenches present, etc., as will be clarified below.

Figure 2:
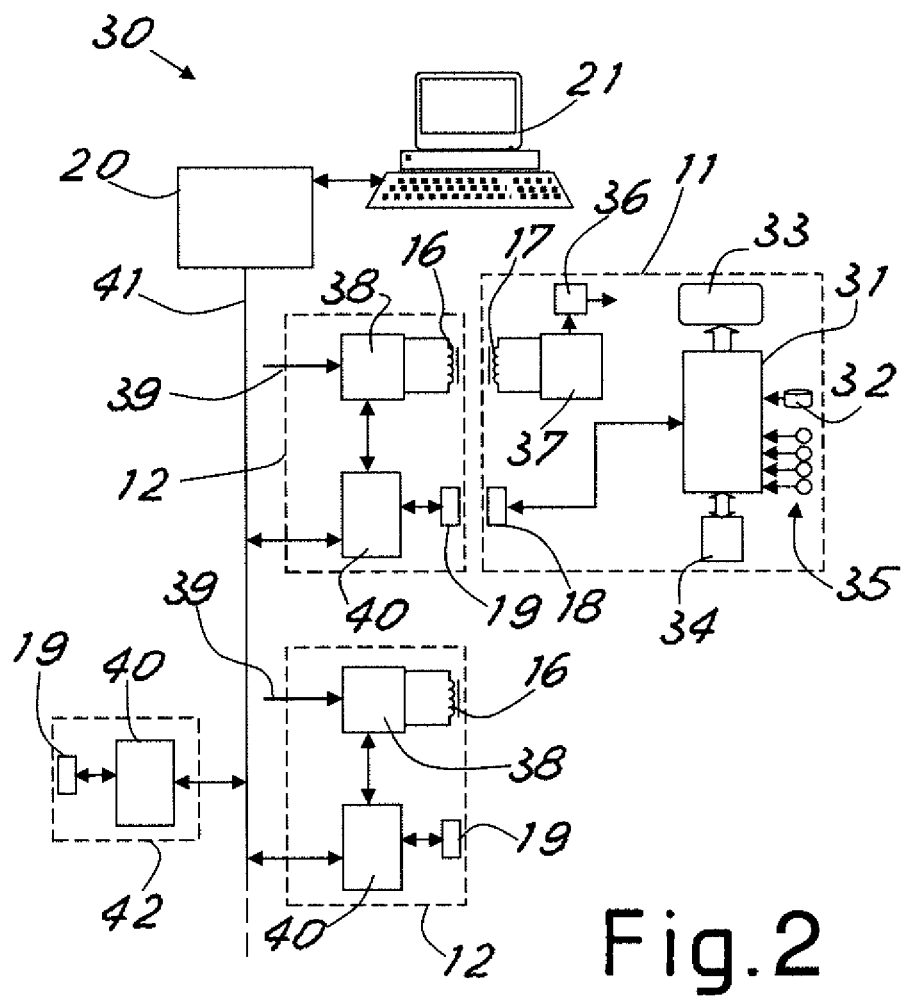
FIG. 2 shows a block diagram of a system of torque wrenches according to the invention.

FIG. 2 shows a block diagram of a possible system of wrenches according to the invention. This system, denoted generically by 30, comprises at least one wrench 11 and at least one external NFC unit, for example in a recharging base 12. Typically there will be, however, several wrenches 11 and several communication units and any recharging bases 12.

Advantageously, the wrench 11 will contain a control unit 31, for example with suitably programmed microcontroller, which will detect, by means of suitable known sensors 32 (for example angle and torque sensors), the tightening parameters applied with the wrench to a part to be tightened (for example a nut or a bolt). The various data useful for the user will be displayed by the control unit on a display 33. Moreover, the tightening parameters and/or the comparison values may be stored in a suitable memory 34. Commands may be entered by the user via pushbuttons 35 on the wrench.

All of the circuits of the wrench will be powered by a suitable battery 36, which is advantageously rechargeable. Recharging may be performed by means of a recharging circuit 37 which receives the electric power from the reception coil 17 which is coupled inductively with the corresponding transmission coil 16 of the recharging base 12. Alternatively recharging may be performed using other traditional systems.

Advantageously, the wrench 11 comprises the NFC module 18 which receives/transmits information under the control of the control unit 31.

The information received from the wrench via the NFC module may be transferred by the control unit into the memory 34 in order to modify for example the operating settings and parameters of the wrench. In this way the wrench may be automatically set for a particular use. The information in the memory may also be modified or updated by the control unit based on the use of the wrench and/or transferred from the NFC module of the wrench to an external system when the wrench is moved sufficiently close to an external NFC module (for example of a wrench management system, a recharging base and/or another wrench with NFC according to the invention).

As shown again in FIG. 2, the recharging base 12 may comprise the coil 16 which receives, advantageously via a power supply and control unit 38, the electric power to be transmitted inductively to the coil 17 of a wrench placed on the base. The unit 38 may in turn receive an electric power supply from a known external source 39 (for example a traditional electrical power supply network).

The transmission between the two coils 16 and 17 will take place at a suitable alternating frequency (for example between 10 KHz and 200 KHz) in order to obtain a good efficiency in the inductive transmission of the power. In this case, the power supply and control unit 38 will receive the power supply voltage from the source 39 (for example a mains power supply of 220V-50 Hz, or other locally used values) and will convert them to the voltage and frequency necessary for exciting the coil 16 for inductive transfer to the receiving coil 17. The recharging circuit 37 will convert the electric power received from the coil 17 to the voltage and frequency values (for example low voltage and direct current) necessary for correct recharging of the specific electric battery 36 of the wrench.

The unit 37 may also interrupt or start recharging of the battery depending on the charged state of the said battery.

As can be seen again in FIG. 2, the recharging base 12 may also advantageously comprise the NFC module 19 which is coupled with the NFC module present in the wrench for data transfer to and from the wrench arranged on the recharging base. The recharging base thus also forms an NFC unit.

Here "coupling" is understood as meaning that the wrench and the NFC devices with which it must communicate are moved sufficiently close together to allow the NFC modules to come into contact with each other.

As already mentioned, the NFC modules 18 and 19 may for example advantageously transfer information useful for recharging, which the module 19 may send for this purpose to the unit 38 and/or exchange information which the NFC module 19 may send to and/or receive from the wrench management unit 20, optionally via a suitable interface 40 and a data communication line 41 of the type known per se (for example a LAN network).

The management system may also comprise one or more terminals 21 (for example desktop or portable computers, tablets, etc.) for interfacing with users or personnel responsible for managing the system.

The use of NFC modules 19 allows data to be transferred to and from a wrench 11 and, if necessary, between a wrench and management unit 20, by simply moving a wrench close to the module. The NFC modules 19 may also comprise a memory programmed or programmable with data to be sent to a wrench which is moved close to the module. This allows for example a wrench to be set for a particular use by simply moving it close to the appropriate module 19.

As mentioned above, the NFC modules 19 may also be used without a recharging base, i.e. inserted in a communication unit 42. The communication unit 42 (as well as the NFC modules where present in the recharging bases) may be stand-alone units which are suitably programmed or also may be connected to the communication line 41, if necessary via a suitable interface 40.

The communication units in their simplest form may also be realized in the form of an NFC smartcard activated by the proximity with a wrench 11. In this case the communication unit may be the "target" of the NFC standard and the module in the wrench may be the "initiator". The information contained in the smartcard may thus be transmitted to the wrench (or vice versa) by simply moving the smartcard and wrench close to each other.

Figure 3:
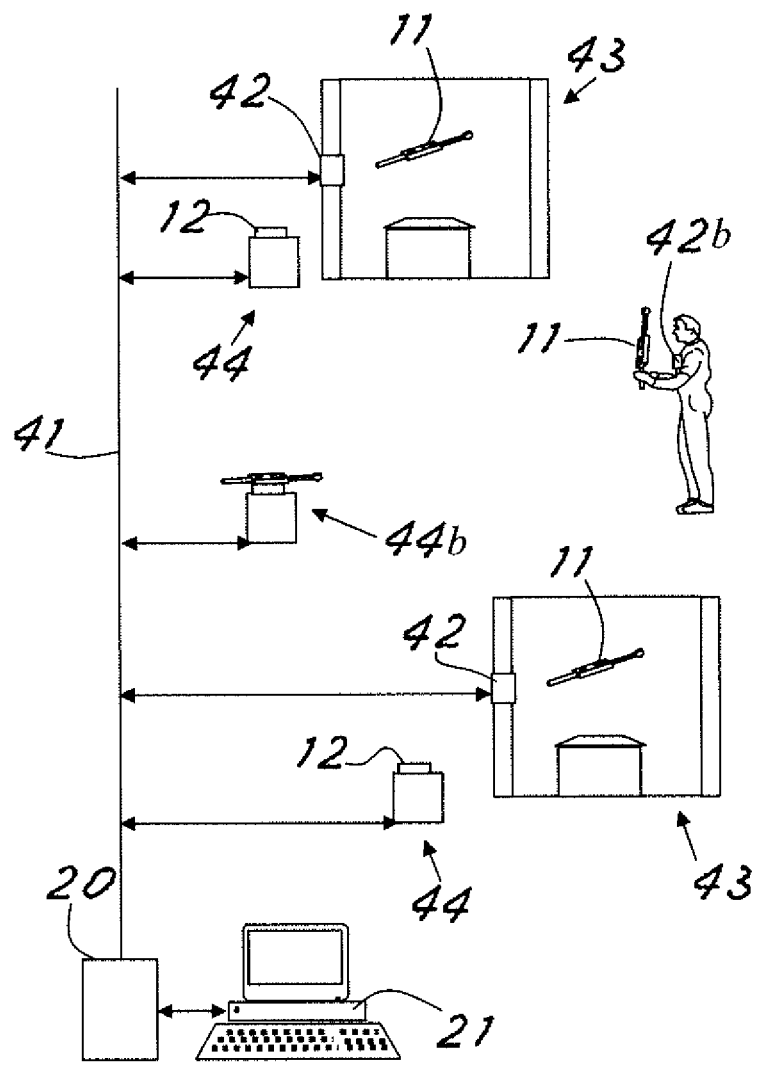
FIG. 3 shows a schematic view of a system of wrenches according to the invention, associated with a plant which uses such a system.

FIG. 3 shows in schematic form a system according to the invention applied to a generic plant (for example the plant may be a motor-vehicle or motor-vehicle component assembly line).

It is understood that, according to the invention, one or more of the elements shown and described may not be present or may be realized in a different manner and the various elements may be varyingly combined even though here they are described together, as will be obvious to the person skilled in the art from the description provided here of the invention.

FIG. 3 shows by way of example two workstations (or working zones) 43 (obviously the workstations or working zones in the plant may consist of any number as required) in which operations requiring the use of one or more wrenches 11 are performed.

A recharging station 44 in which one or more recharging bases 12 are present may be associated with the single workstation 43 or with several workstations 43. For example, each workstation 43 may be associated with or contain a recharging station 44 in which the wrenches used in the workstation are placed for recharging thereof. The wrenches may also consist of a number greater than those used simultaneously in the workstation so as to have recharging wrenches which can replace the wrenches being used when the latter are discharged and must be charged in the associated recharging station.

If the recharging base also contains the NFC transmission system according to the invention the replacement of the wrenches may be easily traced by the management system which may thus identify which wrenches are being recharged and which are being used in each workstation. During recharging the wrenches may also be programmed for future use and/or for downloading the data acquired during the previous use.

Recharging stations 44*b* (or also only wrench storage stations) not associated directly with a workstation 43 and containing back-up wrenches 11, namely wrenches not specifically programmed for use in a particular workstation, but available for replacing faulty or discharged wrenches, may also be provided.

Advantageously, each workstation may also comprise an associated NFC unit 42 so that a wrench 11 may be indicated and associated with the workstation by simply moving it close to the associated communication unit. The management system may thus for example trace the wrenches entering or leaving the workstation or working zone and the communication unit may also discharge the data from the wrench and/or replace it with specific data for the workstation.

For example, if a wrench used in the station is faulty or if a wrench must in any case be replaced for any reason, the user who is using the wrench may if necessary download in the system the data and the settings present in the faulty wrench (if its NFC module is still operationally able to do this), moving it close to the communication unit and/or loading the data and the settings of the specific wrench to be replaced in a back-up wrench (or in a wrench, if present, removed from the recharging station of the workstation). In this way, a new wrench may be easily rendered operative in the workstation in order to replace the wrench used up to that moment.

A wrench may also be associated with an operator, a workstation or a particular use by moving it close to a previously suitably programmed NFC smartcard according to the invention.

In this case the smart card (indicated by 42*b* in FIG. 3) may be for example in the possession of the operator who must use the wrench. The operator may thus remove a wrench from a recharging unit (44 or 44*b* depending on the situation) and program it for his/her own use by moving up close to the wrench his/her smartcard 42*b* previously programmed with the necessary data (wrench setting and/or user identification data for example for associating the wrench with a user and/or receiving from the management unit the operating parameters of the wrench depending on the user identified).

NFC smartcards for programming the wrenches may also be placed in specific zones of the workstations (or on specific elements, for example motor-vehicle parts, on which the wrench must be used), so that a user, who must carry out tightening operations in a specific zone or on a specific part, may be provided with a more generic wrench and may program it easily for the specific use, by moving it close to the corresponding smartcard.

The same goal may also be obtained by using the more complex units 42 in communication with the management system, but the use of smartcards may be more advantageous owing to their lower cost in the case for example of a large number of different zones or parts on which a wrench 11 must be used. For example a smartcard may be associated with each part of the motor-vehicles being assembled on a motor-vehicle assembly line and a single operator with a single wrench may operate on the various parts, programming in each case the wrench before passing from one tightened part to the next part to be tightened.

NFC smartcards may also be used for activating in the wrench specific functions or programs. For example, a user may be provided with a wrench having internal programs with a certain number of functions already activated and other functions not active at the time. The user may subsequently receive a smartcard programmed to transmit codes for unblocking one or more of the non-active functions in the wrench so as to be able to activate them by moving the smartcard close to the wrench.

For example, this may be used by the supplier of the wrenches to sell additional functions of the wrenches. Basically, the supplier may sell wrenches already containing all the functions provided, but activating initially only the functions which purchaser wishes to buy. At a later time the purchaser may acquire further functions and the supplier must merely provide him/her with a smartcard for activating the new functions acquired. This allows rapid distribution of new functions without having to change the wrenches already being used.

The wrench with the additional functions may then communicate this improvement to the management unit when it is for example placed in a recharging base or moved close to a communication unit. In the event of a fault affecting the wrench, the management unit, which stores the functions and optionally the position of each wrench in the plant, may also active the additional functions in another wrench of the system (for example a wrench in a backup wrench station) without having to acquire again the additional functions.

At this point it is clear how the predefined objects have been achieved.

Owing to use of the NFC mode on its own or in combination with the recharging bases additional flexibility of use may be obtained, as is now clear from the description provided above.

The use of a short-range NFC system also allows the wrench to communicate without interference also during recharging of the battery in the wrench, despite the closeness of the induction field for transfer of electric power from the base to the wrench.

The use of an NFC system also allows data to be easily exchanged from one wrench to another. In this way a wrench to be replaced with another one may also transfer directly its data and programming of the tightening parameters to the other wrench, simply by positioning the two wrenches close to each other and entering via the commands in the wrench which of the two must transfer data to the other one.

This may be useful for example in the case of a faulty wrench or also simply if a discharged wrench must be placed on the recharging base and replaced during use with another one already charged.

The wrench which is then recharged or withdrawn from service may be placed on the recharging base or on a communication unit 42 in order to transmit the information about its non-serviceability (and optionally the information about the wrench which was used to replace it) to the wrench management unit 20.

The use of an NFC and induction recharging base allows for example the provision of wrenches better protected against dirt and the atmospheric agents, it being possible to eliminate the connectors and potential points of entry of dirt and contaminants into the wrench.

The entire wrench may also be made so as to be sealed and protected. Moreover, as a result of induction recharging it is possible to achieve greater freedom of positioning or engagement of the wrenches on the recharging bases and also use of the same base for recharging wrenches of different shapes and sizes. As a result it is possible to have plants with a greater number of wrenches and/or with a smaller number of recharging bases. This results in the advantage for example of also being able to provide and use back-up wrenches.

At this point it is clear how, with a system for managing wrenches in a plant provided in accordance with the principles of the present invention, a greater knowledge about the wrenches used in the plant and an improved statistical basis for their use may be obtained. This may be for example useful for optimizing use of the wrenches, their periodic or extraordinary maintenance, etc.

Also errors associated with the manual introduction of the wrench operating and/or recharging parameters are avoided.

Obviously the description above of an embodiment applying the innovative principles of the present invention is provided by way of example of these innovative principles and must therefore not be regarded as limiting the scope of the rights claimed herein. During the specific implementation of the characteristic features of the present invention only some of the functions or devices described above may be chosen and combined together or, on the other hand, also other known wrench management systems may be incorporated using the principles of the invention.

The invention claimed is:

1. A system comprising a plurality of torque wrenches and a unit for managing the plurality of torque wrenches, characterized in that each of the plurality of torque wrenches comprises an internal NFC module and that external NFC units are provided, these being connected by means of at least one communication line to the torque wrench management unit and being able to exchange information with the plurality of torque wrenches by means of corresponding internal NFC modules of the plurality of torque wrenches when the plurality of torque wrenches are moved close to said external NFC units.

2. The system according to claim 1, characterized in that the plurality of torque wrenches comprise rechargeable internal batteries for powering their internal circuits and at least a number of external NFC units also form recharging bases for receiving the plurality of torque wrenches for recharging the internal batteries.

3. The system according to claim 2, characterized in that each of the plurality of torque wrenches contains a receiving coil for inductive reception of electric power, connected to an internal circuit for recharging the internal battery, and the recharging bases contain transmitting coils for inductive transmission of electric power, a receiving coil of a torque wrench and a transmission coil of a recharging base being intended to be inductively coupled to each other upon coupling of the torque wrench to the external NFC unit which also forms the recharging base for inductively transferring the electric power from the base to the torque wrench and recharging the internal battery of the torque wrench.

4. The system according to claim 1, characterized in that at least some of the external NFC units are associated with workstations of a manufacturing plant using the plurality of torque wrenches.

5. The system according to claim 1, characterized in that it comprises additional NFC units in the form of NFC smartcards able to communicate with the internal NFC modules of the plurality of torque wrenches and/or with the external NFC units and/or with other additional NFC units in the form of NFC smartcards.

6. The system according to claim 5, characterized in that at least some additional NFC units in the form of NFC smartcards are associated with parts to be tightened in workstations of a processing plant.

7. A method for managing a plurality of torque wrenches in a system that comprises a unit for managing the plurality of torque wrenches, where each of the plurality of torque wrenches comprises an internal NFC module and that external NFC units are provided, these external NFC units being connected by means of at least one communication line to the torque wrench management unit and being able to exchange information with the plurality of torque wrenches by means of the internal NFC modules, the method comprising:

exchanging with the plurality of torque wrenches operating parameters and/or data by means of the internal NFC modules of the plurality of wrenches, wherein said exchanging is accomplished by performing one or more of the following:

when a torque wrench is connected to a recharging base equipped with an NFC module, exchanging with the internal NFC module of the torque wrench the operating parameters and/or data by means of the NFC module of the recharging base;

when a torque wrench is moved close to a communication unit equipped with an NFC module, exchanging with the internal NFC module of the wrench operating parameters and/or data by means of the NFC module of the communication unit; or when a torque wrench is connected via its internal NFC module to the internal NFC module of another torque wrench, exchanging with the other torque wrench operating parameters and/or data by means of the respective internal NFC modules of the torque wrenches.

8. The method according to claim 7, characterized in that internal operating programs with functions which are activated upon reception of an unblocking code by the internal NFC module of the torque wrench are inserted in at least some of the plurality of torque wrenches, and at least one of said additional NFC units in the form of NFC smartcards is programmed to send this unblocking code.

9. The method according to claim 7, characterized in that at least some of said additional NFC units in the form of NFC smartcards are programmed to send operating parameters of the plurality of torque wrenches to the internal NFC modules of the plurality of torque wrenches, said at least some additional NFC units in the form of smartcards being positioned close to parts to be tightened using the plurality of torque wrenches depending on these operating parameters, and before tightening one of said parts the torque wrench being moved close to the corresponding additional NFC unit in the form of a smartcard so as to adapt the torque wrench for tightening of this part.

10. The method according to claim 7, characterized by associating with workstations of a processing plant at least some NFC units and programming of the plurality of torque wrenches for use in one of these workstations by moving the plurality of torque wrenches close to the associated NFC units.

11. The method according to claim 7, characterized by programming at least one of said additional NFC units in the form of a smartcard for transmitting operating parameters of a torque wrench and entering these operating parameters in one of the plurality of torque wrenches by moving this torque wrench close to this additional NFC unit in the form of a smartcard.

12. The method according to claim 7, characterized by programming at least one of said additional NFC units in the form of a smartcard for transmitting an identification code of a user and associating a torque wrench with a user by moving this torque wrench close to this additional NFC unit in the form of a smartcard.

\* \* \* \* \*